Nov. 19, 1935.  F. W. COTTERMAN  2,021,645
AUTOMATIC CLUTCH AND TRANSMISSION MECHANISM
Filed Jan. 26, 1934  5 Sheets-Sheet 1

INVENTOR
Frederick W. Cotterman

Nov. 19, 1935.   F. W. COTTERMAN   2,021,645
AUTOMATIC CLUTCH AND TRANSMISSION MECHANISM
Filed Jan. 26, 1934   5 Sheets-Sheet 2

INVENTOR
Frederick W. Cotterman

Nov. 19, 1935.  F. W. COTTERMAN  2,021,645
AUTOMATIC CLUTCH AND TRANSMISSION MECHANISM
Filed Jan. 26, 1934  5 Sheets-Sheet 3

INVENTOR
Frederick W. Cotterman

Nov. 19, 1935.    F. W. COTTERMAN    2,021,645
AUTOMATIC CLUTCH AND TRANSMISSION MECHANISM
Filed Jan. 26, 1934    5 Sheets-Sheet 4
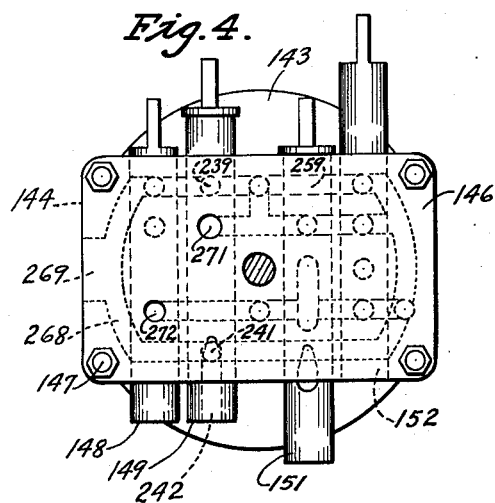
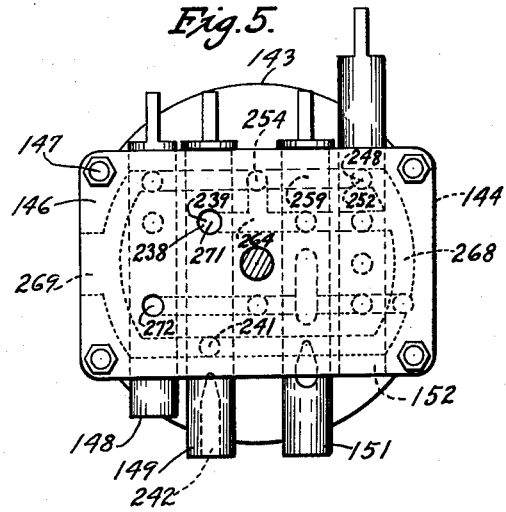
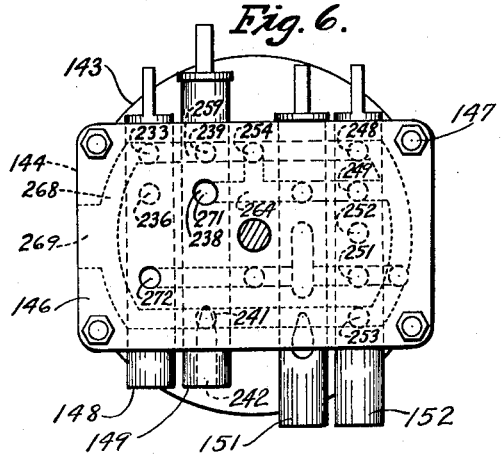
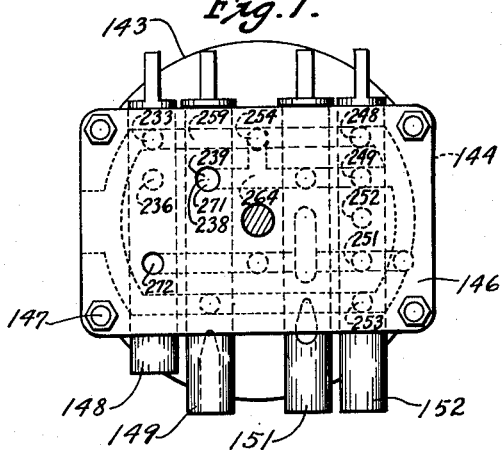
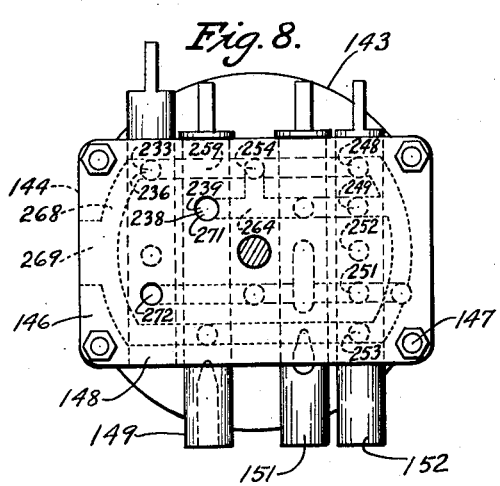
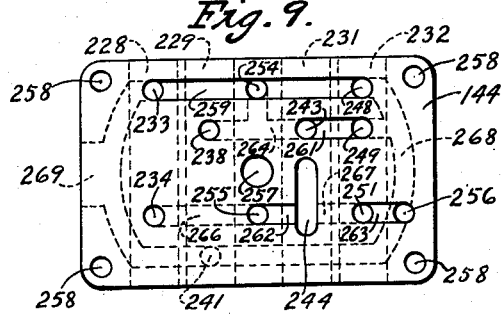
INVENTOR
Frederick W. Cotterman Nov. 19, 1935.  F. W. COTTERMAN  2,021,645
AUTOMATIC CLUTCH AND TRANSMISSION MECHANISM
Filed Jan. 26, 1934  5 Sheets-Sheet 5
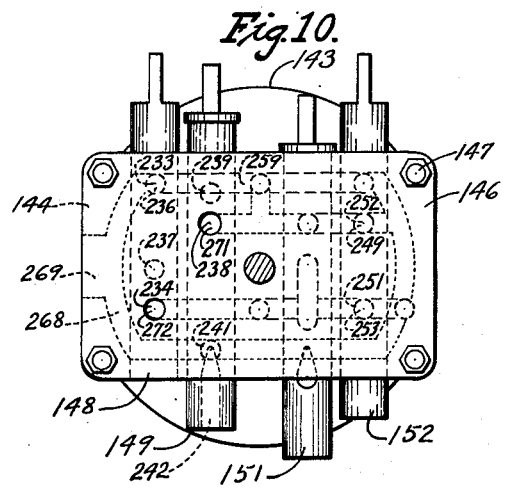
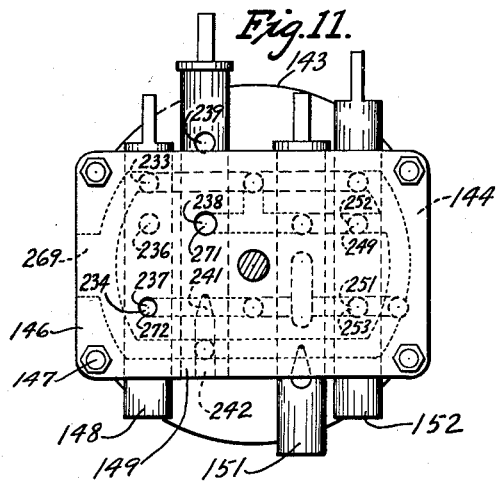
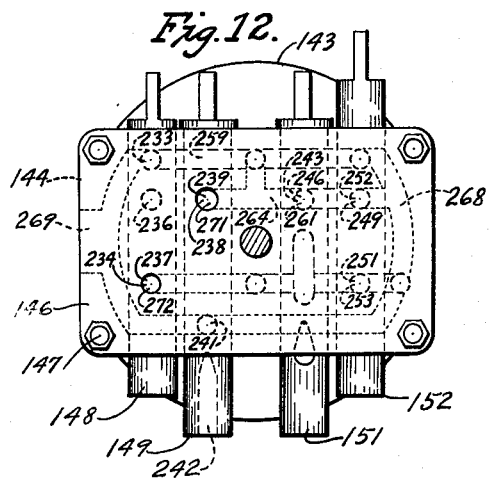
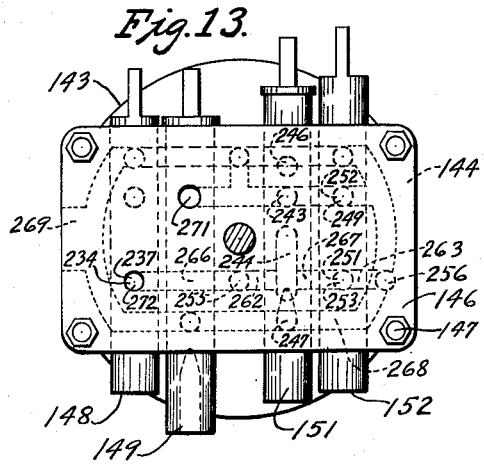
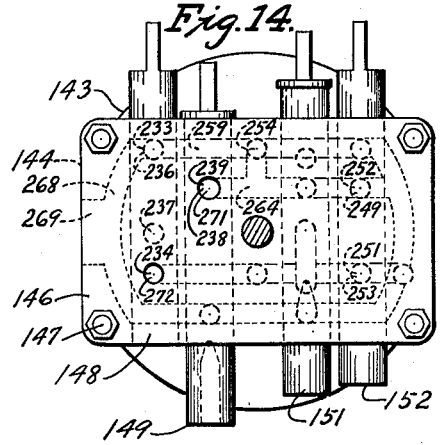
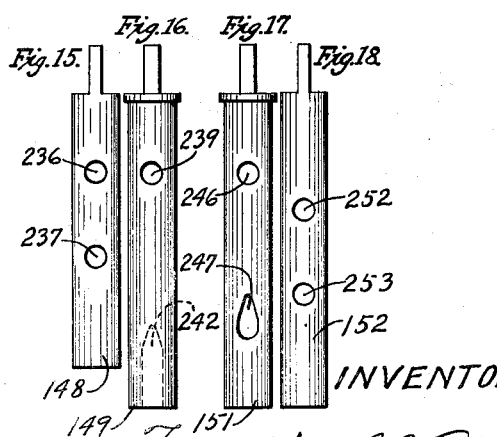
INVENTOR
Frederick W. Cotterman Patented Nov. 19, 1935

2,021,645

UNITED STATES PATENT OFFICE 2,021,645

AUTOMATIC CLUTCH AND TRANSMISSION MECHANISM

Frederick W. Cotterman, Dayton, Ohio, assignor of one-half to Bessie D. Apple, Dayton, Ohio Application January 26, 1934, Serial No. 708,444

20 Claims. (Cl. 192—.01)

This invention relates to transmission mechanism which is particularly applicable to motor vehicles and utilizes some of the features of my co-pending applications Serial Numbers 694,627 and 661,325, filed October 21st, 1933 and March 17th, 1933 respectively.

An object of the invention is to provide a mechanism which follows conventional automotive practice in the respect that there is a transmission gear-set, through which the vehicle may be driven by the engine either directly or through gearing, and an engine clutch in the flywheel operable to connect the engine to or disconnect it from the gear set, but in which both the gear-set and the engine clutch are automatically operable and are interconnected in such a manner that the operation of the one influences the operation of the other.

Since the advent of "free wheeling" as applied to automotive control devices, there has been considerable disagreement among automobile operators as to the desirability of this feature, one class contending that the less mechanism that must be revolved by the momentum of the vehicle when it overruns the engine the better; a second class contending that it is better to have the vehicle momentum drive the engine against its compression as well as the intervening mechanism whenever the vehicle overruns in order that its movement may be better controlled and restrained; a third class of operators agree that free-wheeling is highly desirable to conserve fuel but is very undesirable when it becomes necessary to bring the vehicle quickly to a stop by application of the brakes.

It is therefore another object of this invention to provide automatic free-wheeling mechanism together with a manual control means within the reach of the operator which he may set to one of several positions whereby he may select that one of the aforesaid degrees of free-wheeling which to him seems best.

Another object is to provide an engine clutch for connecting the engine and transmission, and a transmission clutch for changing from gear to direct drive, both clutches being automatic, the latter being speed-torque responsive but always operative to move into disengaging position at a fixed minimum vehicle speed, together with means to utilize the said movement of the said transmission clutch to disengage the said engine clutch if the accelerator pedal is at that time released, to the end that the engine clutch will at all times automatically disengage if the accelerator is released and the vehicle is free-wheeling and its speed then falls below the said fixed minimum.

Other objects, namely, providing a transmission gear-set having a clutch which operates to change from gear to direct drive when the power overcomes the load regardless of speed; utilizing the axial component of the load carried by helical gear teeth to resist engagement of the said clutch; providing means to engage or disengage the clutch fully once it starts to change; making the ratio changing mechanism of the gear-set automatic but yet subject to the will of the operator; providing accessible clutch adjusting means and adequate lubricating means, all more fully set forth in the co-pending applications hereinbefore mentioned, are likewise attained in the structure herein disclosed.

Further objects and meritorious features will become apparent from a consideration of the following specification, when taken in conjunction with the drawings wherein, Fig. 1 is a longitudinal-vertical-axial section taken through an embodiment of the clutch and transmission mechanism.

Fig. 2 is a side elevation and Fig. 3 a plan view.

Fig. 4 is a view of the air valve mechanism wherein the manually operated valve is set to provide full free wheeling through disengagement of the engine clutch whenever the accelerator pedal is released, but the accelerator pedal operated valve is shown in the position it occupies when the accelerator pedal is depressed, the position of the centrifugally operated valve and the brake pedal operated valve being here immaterial inasmuch as they are rendered ineffective to control the clutch because of the position of the manually operated valve.

Fig. 5 is a view like Fig. 4 except that the accelerator operated valve has been shifted to clutch releasing position by release of the accelerator pedal whereby free wheeling is established.

Fig. 6 is a view of the air valve mechanism wherein the manually operated valve is set to prevent free wheeling through clutch disengagement when the accelerator pedal is released, the accelerator pedal operated valve being here shown positioned for engine clutch engagement as it is when the accelerator pedal is depressed, the centrifugally operated valve being positioned for clutch engagement as it is when the vehicle moves above a predetermined minimum speed, the position of the brake pedal operated valve being here immaterial inasmuch as it is rendered ineffective to control the clutch by the position of the manually operated valve.

Fig. 7 is a view like Fig. 6 except that the accelerator pedal operated valve is moved to the clutch disengaging position as it is when the accelerator pedal is released although no clutch disengagement occurs because of the setting of the manually operated valve.

Fig. 8 is a view like Fig. 6 except that the centrifugally operated valve is moved to clutch disengaging position whereby the clutch is disengaged, not by release of the accelerator pedal but only by the falling of the vehicle speed below the predetermined minimum.

Fig. 9 is a detail front elevation of the valve block through which the valve plungers operate.

Fig. 10 is a view of the air valve mechanism wherein the manually operated valve is set to an intermediate position to provide controlled free wheeling, that is to provide free wheeling by withdrawing the engine clutch whenever the accelerator pedal is released, but to reengage the clutch if and when the brakes are applied, unless such brake application is being made when or after the vehicle speed has fallen below the predetermined minimum, the accelerator pedal operated valve being shown in the clutch engaging position, the centrifugally operated valve being shown in its clutch disengaging position, and the brake pedal operated valve being shown in its clutch disengaging position, all as they will appear when the accelerator pedal is depressed, the brakes released and the vehicle moving below the predetermined minimum speed.

Fig. 11 is a view like Fig. 10 except that, by further depression of the accelerator pedal to gain more vehicle speed, the accelerator pedal operated valve has been further moved and the centrifugally operated valve has been moved by vehicle speed to its clutch engaging position.

Fig. 12 is a view like Fig. 11 except that, by release of the accelerator pedal, the accelerator pedal operated valve has been returned to its clutch disengaging position.

Fig. 13 is a view like Fig. 12 except that, by application of the brake pedal, the brake pedal operated valve has been moved to its clutch engaging position.

Fig. 14 is a view like Fig. 13 except that, by braking the vehicle speed to a point below the predetermined minimum, the centrifugally operated valve has been moved to its clutch disengaging position.

Fig. 15 is a front elevation of the centrifugally operated valve plunger as it appears when removed from the valve block Fig. 9.

Fig. 16 is a front elevation of the accelerator operated valve plunger as it appears when removed from the valve block Fig. 9.

Fig. 17 is a front elevation of the brake pedal operated valve plunger as it appears when removed from the valve block Fig. 9.

Fig. 18 is a front elevation of the manually operated valve plunger as it appears when removed from the valve block Fig. 9.

Fig. 19 shows the push button control.

Similar numerals refer to similar parts throughout the several views.

Figure 1:
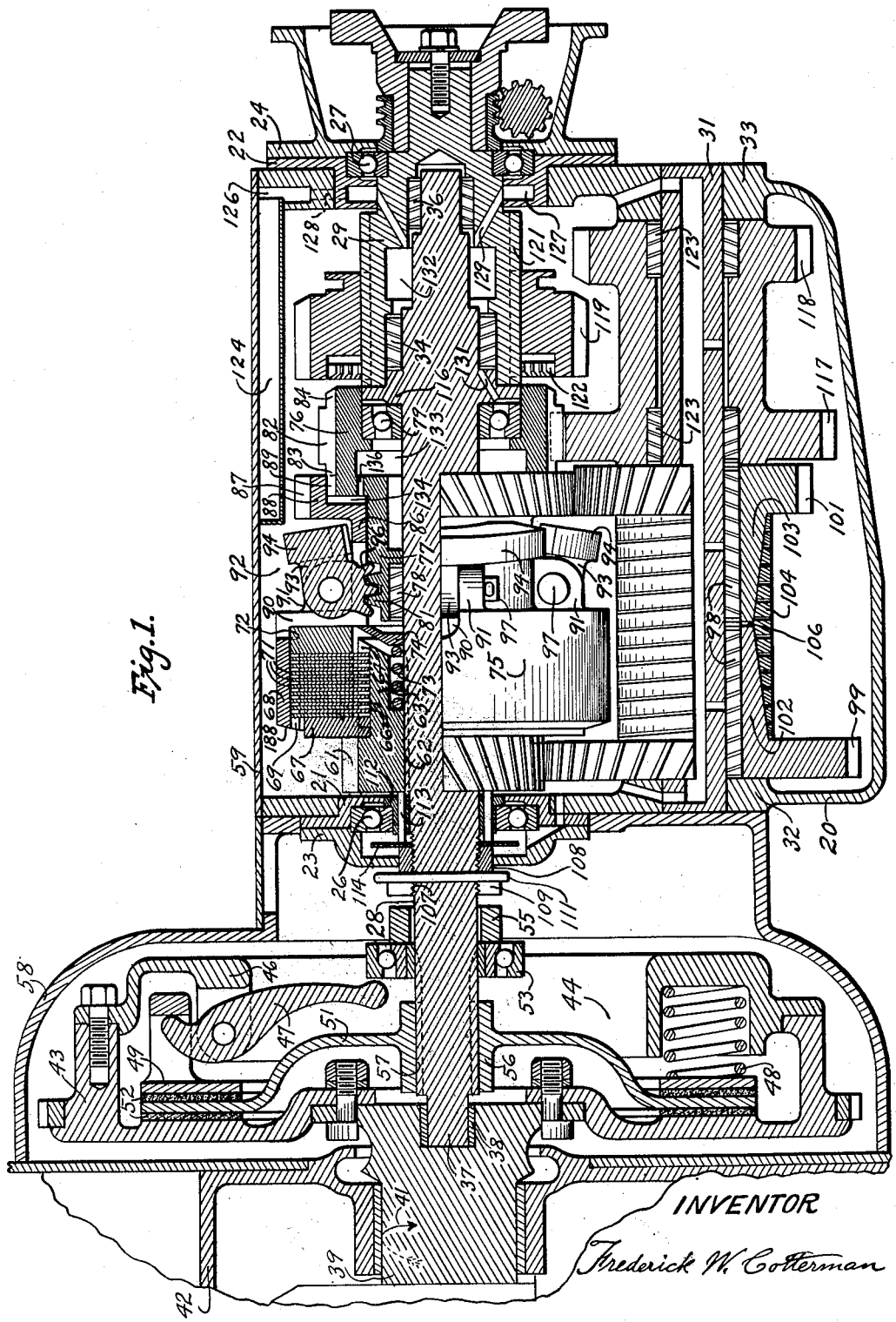

Referring more particularly to Fig. 1, the housing 20 carries the ball bearing cages 21 and 22 within which the bearing covers 23 and 24 hold the ball bearings 26 and 27, which in turn provide rotative support for the high speed drive shaft 28 and a co-axial low speed driven shaft 29. A parallel spaced apart countershaft 31 is non-rotatably fixed in the hubs 32 and 33.

The rear end of the drive shaft 28 is rotatable within the driven shaft 29 on roller bearings 34 and 36. The front end of the drive shaft 28 is reduced in diameter at 37 and is rotatable within the bearing bushing 38.

The bushing 38 is not provided for giving rotative support to the drive shaft 28, inasmuch as it already has the two widely spaced apart bearings 26 and 36, but for insuring alignment of the drive shaft 28 with the engine crank shaft 39. The arrow 41 shows the direction which the engine rotates.

The engine 42 has a flywheel 43 which contains the engine clutch which may be broadly designated by the numeral 44. A clutch cover 46 carries the dogs 47 and the springs 48 which move the pressure plate 49 rearward and forward respectively.

The clutch disc 51 has secured thereto suitable friction facings 52 which are normally gripped between the flywheel 43 and the pressure plate 49 but are freed when the dogs 47 draw the pressure plate rearward, which occurs when the thrust bearing 53 is moved forward against the inner ends of the dogs. A clutch operating fork 54 (see Figs. 2 and 3) has ends 55 which bear upon the thrust bearing 53 to move it forward. The vacuum means provided for moving the clutch operating fork 54 to disengage the clutch 44 will be hereinafter described. The hub 56 of the clutch disc 51 is slidably splined at 57 to the shaft 28.

The function of the engine clutch 44 is of course to connect the crankshaft 39 to the drive shaft 28, whereby, the two said shafts may revolve in unison, or to disconnect it therefrom whereby they may revolve at different speeds.

Free-wheeling, as it is referred to herein, comprises releasing the accelerator pedal and disengaging the engine clutch 44 thereby permitting the engine to die down to idling speed while the vehicle continues on by its momentum, driving the low and high speed shafts 29 and 28 and the clutch disc 51 in unison and at greater speed than the engine crank shaft 39.

Secured to the engine 42 is the flywheel cover 58 which in turn supports the transmission housing 20 and its cover 59. Rotatable within the housing 20 about the axis of the shafts 28, 29 and 31 are the transmission gears, the front half of the housing containing an automatically operable gear-set and the rear half a manually operable gear-set.

Each set comprises a drive gear, a driven gear, and two spaced apart countershaft gears. For convenience in description the two sets will be distinguished by referring to them as the automatically operated gears and the manually operated gears.

It will be observed that the last driven member of the automatic unit is the element from which power is taken to drive the manual gears. When the automatic unit transmits the power, without the manually operated gears, as is the case when the manually operated sliding gear is in its forward position, this last driven member of the automatically operable set is the element from which power is taken to drive the vehicle. For clearness therefore, the element herein, which is the driving gear of the manually operated set, will, when used in a combination of elements defining the automatically operated mechanism, be referred to as the power take-off element.

In the automatically operated gear-set is the drive gear 61 which has internal splines fitted snugly to the external splines 62 of the drive shaft 28. Gear 61 always rotates in unison with the drive shaft 28.

The drive gear 61 has a rearwardly extending hub 63 with teeth 64 around its periphery. A series of driving clutch plates 66 are internally toothed to fit over the teeth 64 and consequently rotate in unison with the gear 61. One driving clutch plate 67 is thicker than the remaining driving plates 66 and is preferably press fitted to the teeth 64, while plates 66 are slidable thereon.

A clutch drum 68 has internal teeth 69 around its periphery. A series of driven clutch plates 71 are externally toothed to fit slidably in the teeth 69 and consequently rotate in unison with the drum 68. A thicker driven plate 72 is adjacent the web of the clutch drum. A coil spring 73 bears against the washer 74 and thereby urges the clutch drum 68 rearwardly. Driving clutch plates 66 and driven clutch plates 71 alternate in position in the assembled structure. It will be apparent that pressure applied to the rear end of the clutch drum 68 which will move it forward will have the effect of compacting the clutch plates 66 and 71 whereby the clutch will be engaged. The clutch just described will be called the transmission clutch and will be broadly designated by the numeral 75.

Gear 76 is the last driven gear of the automatically operated gear-set. It is also the driving gear of the manually operated set. It is also the power take-off element of the automatically operated set.

Gear 76 has a long forwardly extending hub 77 ground smooth and round on its outside. The forward end of the hub 77 has rotative support on the drive shaft 28 by the roller bearing 78. The rear end of gear 76 has rotative support on the drive shaft 28 by the combined radial and end thrust ball bearing 79. At four places on the outside of the hub 77 it is grooved transversely to provide the rack teeth 81. The outside of gear 76 has straight spur gear teeth 82. These are reduced in height at both ends of the teeth to provide two sets of clutch teeth 83 and 84.

The clutch drum 68 has a rearwardly extending hub 86 fitted slidably over the hub 77 of the gear 76. The rear end of the hub 86 has the helical gear 87 integral therewith. The helical gear 87, the hub 86 and the clutch drum 68 are preferably made from a single steel forging and hardened. The rim 88 of the helical gear 87 has internal clutch teeth 89 which fit slidably but snugly over the clutch teeth 83. Because of clutch teeth 83 and 89, the driven element comprising the helical gear 87, the hub 86 and the clutch drum 68 has limited axial movement on the hub 77 but does not have any rotative movement with respect thereto.

Four slots 90 are cut through the rear face of the clutch drum 68 and extend also through the hub 86. Flush with the edges of these slots are four pairs of hinge ears 91 between which the centrifugal members 92 are hingedly supported. Each memebr 92 comprises the hinge end 93 and an arcuate weight portion 94 extending transversely of the hinge end.

At the inner side of the hinge ends 93 are pinion teeth 96 which mesh with the rack teeth 81 of the hub 77. The hinge pins 97 provide fulcra about which the centrifugal members 92 may swing. It will be seen that outward swinging of the weight portions 94 will force the clutch drums 68 forward and thereby engage the clutch 75. The ball bearing 79 takes the axial thrust due to the gear 76 being forced rearward as the clutch engages.

Rotatable on roller bearings 98 about the countershaft 31 and in mesh with the gears 61 and 87 are the countershaft gears 99 and 101. Gears 99 and 101 have long tapered hubs 102 and 103 extending toward each other. An external wrap ratchet spring 104 is internally tapered to suit the hubs 102 and 103. It is common practice in making spring ratchets to make the end turn of the spring weaker than the middle. This is usually accomplished by grinding a series of circumferentially spaced apart longitudinal grooves in the outside of the spring, the grooves becoming deeper as they approach the ends of the spring. The object of weakening the end turns is to facilitate engagement of the spring with the hubs without having the spring fit the hubs so tightly.

In the improved structure shown the end turns of the spring are weaker because of the taper bore. But the taper in turn serves a further useful purpose. The helix angle of the gears 99 and 100 is such that when any load is carried by them they are forced axially toward each other.

When the gears 99 and 100 are running idle and under no load, the spring 104 is of sufficient length and strength to force them slightly apart thus providing the gap 106 between the ends of the hubs. But when the gears begin to take up the load and the spring 104 begins to wrap about the hubs 102 and 103, the greater the load the more the taper hubs are forced axially into the tapered interior of the already tightly wrapped spring 104. This feature adds greatly to the driving capacity of the spring. The spring 104 is coiled right hand so that the gear 101 may revolve faster but not slower than the gear 99.

The teeth of the gears 61 and 87 have helix angles of proper form to mesh with the teeth of gears 99 and 100. A portion of the automatically operated gear-set in Fig. 1 is shown in elevation to show the helix angles which are preferably employed. It will be seen that while the load carried by the gearing forces the countershaft gears 99 and 100 axially together, the gears 61 and 87 will for the same reason be forced axially apart. It will also be apparent that when the gears 61 and 87 are forced axially apart the transmission clutch 75 will be disengaged.

It follows that while the centrifugal force of the weights 94 tends always to engage the clutch 75, any tangential load transmitted by the gears 61, 99, 100 and 87 has an axial component which opposes the weights and thereby retards clutch engagement. The result is that the greater the load being transmitted by the gears, the higher the speed which must be attained before the clutch will engage to change from gear to direct drive.

The clutch disengaging spring 73 is preferably of such strength that it will be overcome by the weights 94 at a vehicle speed of about 8 M. P. H., whereby the clutch 75 will be engaged, but this is only true when the spring 73 has no assistance from the helical gear 87. It follows that the clutch drum 68 will always be in its rearward or disengaged position at a vehicle speed of less than 8 M. P. H., and it will be there at higher vehicle speeds when said speeds impose a load on the helical gearing. But it will always go to the forward or engaged position when a vehicle speed of 8 M. P. H., is reached unless restrained by a helical gear load. From this it will be seen that whenever the accelerator pedal is suddenly released so that the vehicle moves faster than the engine is driving it, the clutch drum will move forward if the speed is over 8 M. P. H., and rearward if the speed is under 8 M. P. H. This is because the helical gears are now at zero load and the spring 73 alone controls the position of the clutch drum.

This faculty of the clutch drum 68, namely, that when the accelerator pedal is released at a speed of over 8 M. P. H., the drum will move forward if it is not already forward, and when released at a speed of less than 8 M. P. H., it will be in a rearward position, is an important feature of this invention, inasmuch as it is used through an instrumentality hereinafter explained to affect operation of the engine clutch 44.

At the forward end of the housing 20 the shaft 28 has the threads 107 to which the nut 108 is fitted. The nut 108 is slotted at 109, and a pin 111 extends through this slot and through the shaft. A flanged hub 112 is fitted tightly to the shaft 28 and the ball bearing 26 is press fitted to this flanged hub. A series of small pins 113 are slidable axially through holes in the hub 112 one end of the pins bearing against the gear 61 and the other end against an oil throw washer 114. Tightening of the nut 108 against the washer 114 will push the pins 113 against the gear 61 whereby the gear 61 may be forced rearward when adjustment of the clutch 75 becomes necessary due to wear on the plates 66 and 71.

When the clutch 75 is engaged, the gear 61 is pressed forward against the pins 113, while the ball bearing 79, not in action, is pressed against the flange 116 of the shaft 28, the entire mass rotating in unison, there being no bearing rotating under axial thrust.

The manually operated gear-set comprises the driving gear 76, the first and second countershaft gears 117 and 118, and the sliding high and low gear 119. A reverse idler gear is required so that the vehicle may be moved backward but inasmuch as it forms no part of this invention it is not herein shown. Sliding gear 119 is shown in the neutral position. It has internal splines which fit slidably over the external splines 121 of the driven shaft 29. The forward face of the gear is recessed and around the periphery of the recess are the internal clutch teeth 122 which may be slidably engaged over the external clutch teeth 84.

The gears 117 and 118 are integral and revolve about the countershaft 31 on roller bearings 123. "Bowden" wire controls not shown may preferably be employed for shifting the slidable gears.

The lubricating means for the countershaft gears is conventional as shown, but the lubricating means for the drive shaft bearings is especially adapted to this mechanism, comprising a trough 124 into which oil is splashed by the gears 87, 82 and 119, the reservoir 126 cast in the housing 20, which receives the oil from the trough 124, the groove 127 in the bearing cage 22, the groove being connected to the reservoir 126 by the hole 128, the small holes 129 and 131 and the rotating oil chambers 132 and 133.

The oil splashed into the trough 124 flows into the reservoir 126, then into the groove 127 through the hole 128. Centrifugal force now prevents its passage through the holes 129. But whenever the shaft 29 ceases to rotate, the oil will flow through the holes 129 into the chamber 132, through the roller bearing 34, through the holes 131, through the ball bearing 79, and into the chamber 133.

It will be observed that the inner ends of the holes 129 are closer to the axis of rotation than the outside diameter of the chambers 132 and 133. The oil which once reaches these chambers while shaft 29 is not rotating will be prevented by centrifugal force from going out of the holes 129 after the shaft again rotates. Lubricating mechanism of this character is shown in my co-pending application Serial Number 675,238, filed June 10, 1933.

Between the forward face of the gear 82 and the rearward face of the gear 87 is a space 134. Space 134 is connected to oil chamber 133 by a small hole 136. By this construction the gear 87 is prevented from moving too rapidly when it shifts into axial position with respect to the gear 82 because oil must be displaced or replaced through the small hole 136. This prevents the clutch 75 being engaged or disengaged too quickly. The size of the hole 136 governs the rapidity of engagement.

To provide a uniform and effective graduation of gear ratios, the manually operated gear-set is preferably made 1½ to 1 and the automatically operated gear-set 2 to 1. This will give a gear reduction of 3 to 1 when both gear-sets are operative, 2 to 1 when the automatically operated gear-set is operative and the manually operated set is in direct drive, 1½ to 1 when the automatically operated set is in direct drive and the manually operated set is in operation and 1 to 1 when both sets are in direct drive.

Secured to the side of the transmission housing 20 by bolts 137 (see Figs. 2 and 3) is a cylinder 138 containing a piston 139. A piston rod 141 is connected to the piston by the nut 142. A cylinder cover 143, a valve block 144 and a valve block cover 146 are all held to the open end of the cylinder by the nuts 147. Valve plungers 148, 149, 151 and 152 are vertically slidable in valve block 144.

Extending laterally from the housing 20 and cast integral therewith are two small short hubs 153 and 154 and two larger and longer hubs 156 and 157. Press fitted into the hubs 153, 156 and 157 are the studs 158, 159 and 161 respectively. The other hub 154 contains the short shaft 162 which is more freely fitted thereto so as to have limited rotative movement therein.

Rotatably movable on the upper stud 158 is an integral forging comprising a hub 163 having the upwardly extending accelerator pedal arm 164, the downwardly extending carburetter control arm 166, and rearwardly extending valve operating arm 167. The accelerator pedal pad, not shown, is carried on the upper end of the stem 168. A carburetter control rod 169 is pivotally secured to the lower end of the arm 166. A link 171 has its upper end pivotally secured at 172 to the valve operating arm 167 and its lower end to the valve plunger 149. The lower end of an extension spring 173 is secured to a pin 174 extending forwardly from the cylinder cover 143 and the upper end is secured to the rearward end of the arm 167 at 176.

When the accelerator pedal is depressed, the arm 164 moves forward, the arm 166 draws the rod 169 rearward and causes the carburetter to feed more fuel, while the arm 167, through the link 171, draws the valve plunger 149 upward against the resistance of the extension spring 173. When the accelerator pedal is released, the spring 173 returns the several parts to the position shown, whereby the fuel is reduced to the minimum safe value for maintaining the idling speed of the engine.

Within the housing 20, and secured to the inner end of the shaft 162 is a downwardly depending arm 177 carrying the stud 178 about which the beveled roller 179 freely rotates. A valve operating arm 181 is firmly secured to the outer end of the shaft 162 by the nut 182. The rearward end of the arm 181 is connected by a link 183 to the valve plunger 148. An extension spring 184 is secured at the upper end to a pin 186 extending laterally from the housing 20 and at the lower end to a pin 187 extending from the plunger 148 whereby the plunger 148 is always urged upwardly, thereby causing the roller 179 to bear against the bevelled edge 188 of the clutch drum 68. Each time the clutch drum 68 is moved forwardly to the engaged position as shown, the roller 179 is pushed forwardly and the valve plunger 148 is pushed to its "down" position thereby extending the spring 184. When the clutch drum 68 moves rearwardly to disengaged position the spring 184 contracts and raises the plunger 148 to its "up" position.

Rotatably movable on the stud 159 is an integral forging comprising the hub 189 having the upwardly extending clutch pedal arm 191 and the downwardly extending clutch operating arm 192. The arm 192 is pivotally connected at its lower end to the piston rod 141 by the link 193, and near the middle to the clutch operating fork 54 by the link 194 and adjusting bolt 195. Bolt 195 extends through a hole in fork 54 and is threaded into the link 194 for purposes of adjustment. A lock nut 200 maintains adjustment after it is made. The clutch operating fork 54 is hinged at 196 in ears 197 extending from the ball bearing cover 23. An extension spring 198 has one end connected to the outer end of the clutch operating fork at 199 and the other end to a pin 201 extending laterally from the flywheel cover 58.

The clutch pedal pad, not shown, is carried on the upper end of the stem 202. When the clutch pedal arm 191 moves forward or the piston 139 moves rearward, the clutch operating arm 192 is moved rearward, the clutch operating fork, at its outer end, is drawn rearward, the spring 198 is extended, and the fork ends 55, moving forward, disengage the engine clutch 44. Release of the clutch pedal or forward movement of the pistons 139 allows the spring 198 to contract and the engine clutch re-engages.

Rotatably movable on the stud 161 is an integral forging comprising the hub 203 having the upwardly extending brake pedal arm 204, the upwardly extending brake operating arm 206, and the rearwardly extending valve operating arm 207. A brake operating rod 208 is pivotally connected to the arm 206 at 209. A link 211 pivotally connects the rearward end of the arm 207 to the upper end of the plunger 151. An extension spring 212 connects at its upper end at 213 to the arm 207 and at its lower end to a pin 214 extending forwardly from the valve block cover 146. The brake pedal pad, not shown, is carried on the stem 216. Depression of the brake pedal moves the brake pedal arm 204, the brake operating arm 206, and the brake operating rod 208 forward to apply the brakes to the vehicle. This moves the rear end of the valve operating arm upward, against the tension of the spring 212 and, through the link 211, raises the valve plunger 151. Upon release of the brake pedal the spring 212 contracts and the several parts are thereby returned to normal position.

Pivoted on the same stud 161 with the brake pedal hub 203 is a long arm 217, one end of which extends rearwardly and is connected by the link 218 to the valve plunger 152. The other end extends forwardly and is connected at 219 through a "Bowden" wire control 221 to a push button 222 on the instrument panel 223. The push button 222 is urged to remain in one of three positions by means of a detent ball 224 which is urged into the notches 225 by a spring 226. Movement of the push button to one of the three positions moves the valve plunger 152 to one of three corresponding positions.

Figure 2:
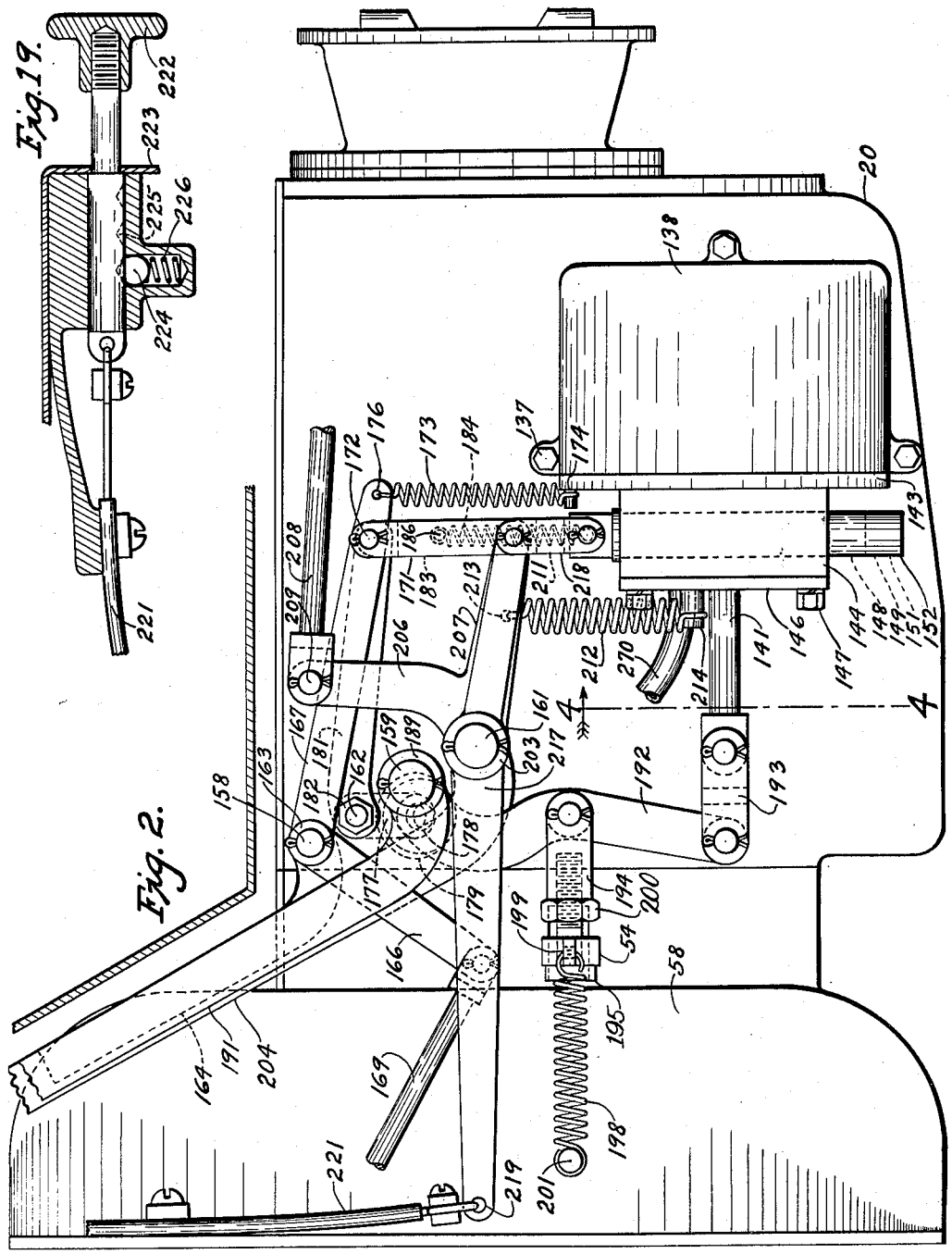
Figure 3:
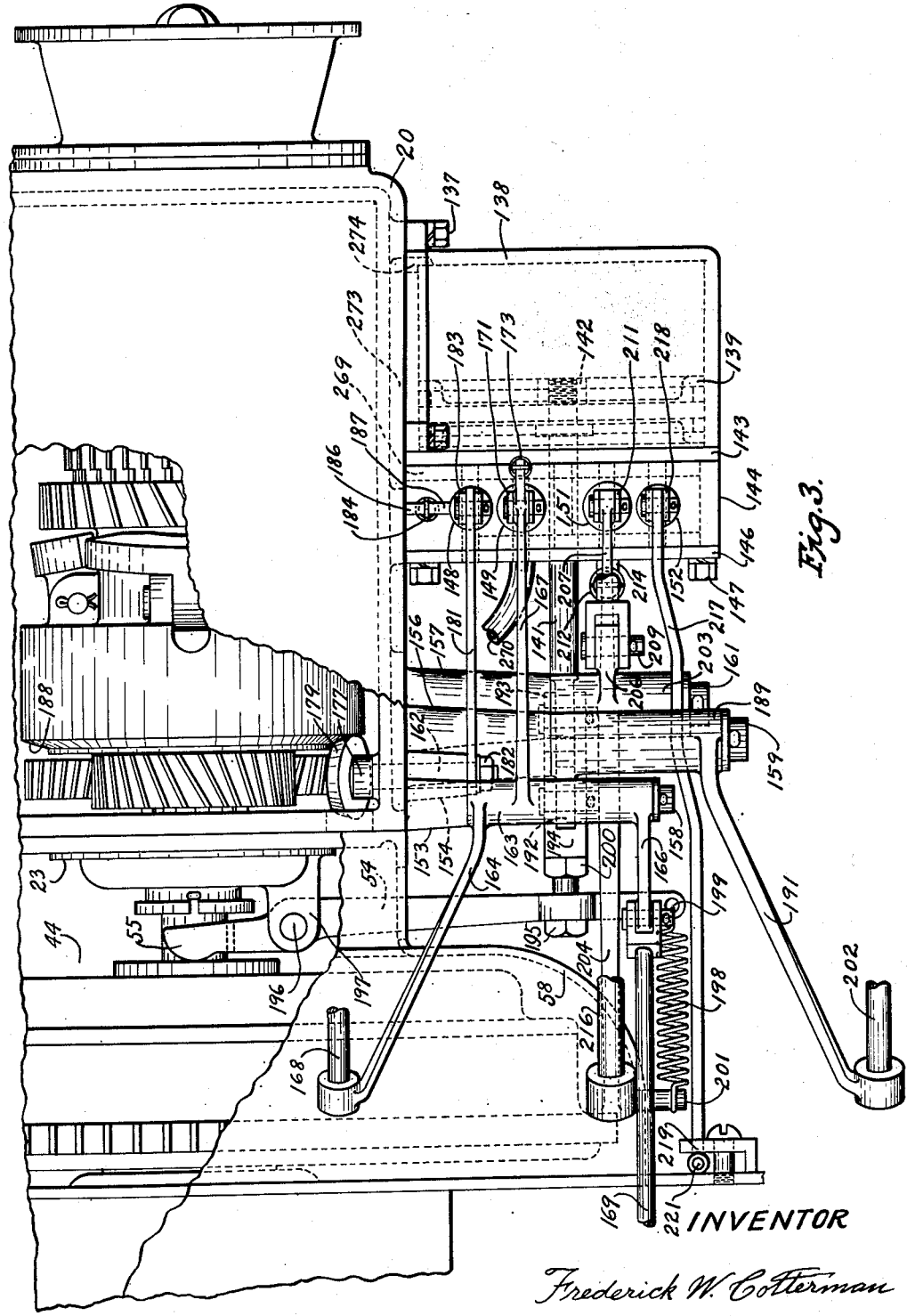

In Figs. 4 to 18 the valve block 144 and the valve plungers 148, 149, 151 and 152 are shown as they appear viewed from the line 4—4 of Fig. 2. In Fig. 9 the valve block itself is shown with the plungers 148, 149, 151 and 152 and the covers 146 and 143 removed. In Figs. 15, 16, 17 and 18 the valve plungers themselves are shown as they appear from the line 4—4 when they are removed from the valve block.

By reference to Fig. 9 it will be seen that valve block 144 has four large vertically extending main holes 228, 229, 231 and 232 for the plungers 148, 149, 151 and 152, Figs. 15 to 18 respectively. Two smaller horizontal holes 233 and 234 extend clear through the block. Holes 233 and 234 are met by the holes 236 and 237 of plunger 148 as it moves up or down through the hole 228. A hole 238 extends horizontally through the block. Hole 238 is met by the hole 239 in the plunger 149 as it moves vertically in the block.

A hole 241 extends horizontally, not clear through the block, but only from the plunger hole 229 out through the rear side of the block. Hole 241 is met by the slot 242 which is cut in the rear side of the plunger 149 from the lower end upward. A round hole 243 and an oblong hole 244 extend horizontally clear through the block. Holes 243 and 244 are met by the holes 246 and 247 in the plunger 151 as it moves vertically in the hole 231. Three holes 248, 249 and 251 extend horizontally through the block. Holes 248, 249 and 251 are met at different times by the holes 252 and 253 of the plunger 152 as it moves vertically to different positions in the hole 232. Holes 254, 255 and 256 extend horizontally clear through the block but do not encounter any of the main plunger holes in doing so. A larger horizontal hole 257 serves as a guide for the piston rod 141. Four horizontal holes 258 are bolt holes through which bolts extend to bolt the block 144 and the covers 146 and 143 to the cylinder 138.

Still referring to Fig. 9, a groove 259 of sufficient depth to have a carrying capacity equal to the horizontal holes is cut in the forward face of the block so as to join the holes 233 and 248. A second groove 261 is cut in the forward face to join the holes 243 and 249. A third groove 262 is cut in the forward face to join the holes 255 and 244. A fourth groove 263 is cut in the forward face to join the holes 251 and 256.

In the rearward face of the block there is a T shaped groove 264 joining the holes 238, 254 and 243. There is a groove 266 joining the holes 234 and 255. There is a groove 267 joining the holes 244 and 251. And there is an extended groove 268 connecting the holes 248, 256, 241 and 233. The groove 268 cuts through the edge of the block to provide the gate 269.

A pipe 270 (see Figs. 2 and 3) has one end connected to the intake manifold, not shown, while the other end extends into the valve block cover 146 at 271 and thus joins the intake manifold to the hole 238 in the block. There is another hole 272 through the cover which opens the hole 234 in the block to the atmosphere. The gate 269 communicates with a passage 273 cast in the side of the housing 20 (see Fig. 3). There is a hole 274 extending through the cylinder 138 at the closed end. The passage 273 joins the gate 269 and the hole 274.

A number of valve plunger positions and combinations of valve plunger positions will make connection between the pipe 271 and the rear end of the cylinder 138. A certain position of the valve plunger 148 will connect the rear end of the cylinder 138 to the atmosphere through hole 272. A certain position of the valve plunger 149 will connect the rear end of the cylinder 138 to the atmosphere through the groove 242. The entire valve mechanism is provided merely for automatically engaging and disengaging the engine clutch 44 when certain movements and combinations of movements are made by the accelerator pedal, the brake pedal, the centrifugally operated transmission clutch 75, and the push button control 222.

Figs. 4 to 8 and 10 to 14 are illustrative of the different valve combinations which occur in driving the vehicle. In Figs. 4 to 8 and 10 to 14 finely dotted lines indicate the grooves which are in the rearward face of the block 144. The coarser dotted lines indicate the grooves which are in the forward face of the block. The covers 143 and 146 close these grooves and make air tight passages of them. Their effect will be seen as the operation of the vehicle is explained. This operation should preferably be as follows:

Full free wheeling operation

After the operator has started and warmed up his engine he shifts the gear 119 forward to mesh the clutch teeth 122 and 84. If he is in mountainous country he may instead shift the gear 119 rearward into mesh with the gear 118 in which case his speeds will be only two-thirds as fast but his hill climbing capacity proportionately greater. Whichever gear ratio he selects he will preferably retain as long as his engine does not again need warming up or as long as he does not encounter harder or easier driving conditions.

Now if the operator is an advocate of full free wheeling he will push the control button 222 clear in and will probably leave it there during the life of the vehicle. This position of the push button 222 places the valve plunger 152 as shown in Figs. 4 and 5.

He now depresses the accelerator pedal which increases the fuel through movement of the rod 169 and at the same time raises the valve plunger 149 by movement of the arm 167. His valve plungers are now positioned as in Fig. 4.

By reference to Fig. 4 it will be seen that the hole 239 of the valve plunger 149 has moved upward and cut off the section from the hole 271 and opened the rear end of the cylinder 138 to the atmosphere through hole 274, passage 273, gate 269, groove 268, hole 241 and valve plunger groove 242. The spring 198, Fig. 2, will now draw the piston 139 forward and permit engagement of the engine clutch 44 while the cylinder fills with air from the atmosphere.

The engine clutch 44 being now engaged, the drive will be from shaft 28 to gear 61, to gear 99, to gear 101, to gear 87, to gear 82, to gear 119, to driven shaft 29, to the vehicle, which will now move forward in automatic gear drive. The axial thrust due to the contact of the helical teeth of the gears 101 and 87 will urge the gear 87 rearward against the effort of the weights 94. The heavier the load being encountered, whether because of rapid acceleration or because of a steep grade, the higher the vehicle speed must be raised before the transmission clutch 75 will engage and change to automatic direct drive.

Sufficient depression of the accelerator pedal will of course raise the speed to the point where the weights will engage the clutch as shown in Fig. 1.

Reference to Fig. 4 will disclose, however, that after the initial movement of the accelerator, whereby the valve plunger 149 is raised as there shown, any further depression of the accelerator will increase the speed and further raise the plunger 149 but that this further rise in the plunger will not affect the status of engine clutch engagement.

If now, after the vehicle is under movement, the operator releases the accelerator pedal, the valve plunger 149 returns to its unoperated position shown in Fig. 5. The hole 239 in the plunger 149 has now met the hole 238 in the block and 271 in the cover while the plunger slot 242 has moved away and closed the hole 241. An air passage will now be completed extending in at hole 271 rearward through hole 238 in the block 239 in the plunger to the slot 264, forward through the hole 254 to the slot 259, rearward through the block hole 248 and plunger hole 252, through the groove 268, gate 269, channel 273 and hole 274 and thereby disengage the engine clutch 44, whereby free-wheeling is established. It will be seen that whenever the push button controlled valve plunger 152 is in the full free-wheeling position shown in Figs. 4 and 5, a depression of the accelerator pedal will engage the engine clutch 44 for driving and a release of the accelerator pedal will disengage the said clutch for free-wheeling, regardless of what movements may be made in the position of the centrifugally controlled valve plunger 148 or the brake pedal controlled valve plunger 157.

No-free-wheeling operation

If the operator is of the class which objects to free-wheeling in any form, he may set the push button control 222 to the "clear-out" position and leave it there. Figs. 6, 7 and 8 show the position which the valve plunger 152 takes when the push button is clear out, or at the no-free-wheeling setting. In this position neither of the plunger holes 252 or 253 are in alignment with the block holes 248, 249 or 251. It follows that no air circuit may now be completed which must pass through the plunger 152.

When the vehicle is at rest and the engine is merely idling, the valve plungers are in the position shown in Fig. 8, whereby the engine clutch 44 is disengaged because the suction passage is in through the hole 271, rearward through the block hole 238 and plunger hole 239 to the groove 264, forward through the block hole 254, then through groove 259, rearward through the block hole 233 and plunger hole 236, through groove 268, gate 269, passage 273 and hole 274 into the block of the cylinder.

When the accelerator is depressed, the valve plunger 149 shifts to the position shown in Fig. 6, cuts off the suction and opens the cylinder to the atmosphere through the groove 242 and hole 241, slot 268, gate 269 etc., as before explained and thereby engages the engine clutch 44. The vehicle will now move in automatic gear drive until the speed is great enough to cause the transmission clutch to engage for automatic direct drive.

As heretofore explained this speed of engagement is variable but always occurs if the speed is over 8 M. P. H., and a zero load condition is created on the helical gears, and zero load condition is always created on these gears when the accelerator pedal is released and the vehicle overruns.

It follows that depressing the accelerator at once changes the valve plunger 149 from the position shown in Fig. 8 to that shown in Fig. 6, and, as soon as the speed sufficiently increases, it also changes the centrifugally controlled valve plunger 148 from the position Fig. 8 to the position Fig. 6. This latter change, however, never occurs before 8 M. P. H., and may be much higher depending on the load being carried on the helical gears, but in any event it will always occur at a speed exceeding 8 M. P. H., if zero load is established by overrunning of the vehicle.

If the accelerator is now released and the valve plunger 149 returns to the position shown in Fig. 7, the engine clutch will not disengage because, while the suction passage is open through holes 271, 238, 239, slot 264, hole 254, slot 259 it can get no further because there is now no passage either through plunger 148 or through plunger 152. It follows that the accelerator pedal may alternately be depressed and released at will and there will be no clutch disengagement for free-wheeling.

If, however, while the accelerator pedal is released, the speed decreases below 8 M. P. H., the plunger 148 will then again move to the position Fig. 8 and the engine clutch 44 will disengage, because the suction passage through plunger 148, which an instant before was closed, is now open through the block hole 233 and plunger hole 236.

It should be noted that, with this no-free-wheeling setting, the engine clutch 44 may be disengaged for free-wheeling only by releasing the accelerator pedal at less than 8 M. P. H., or releasing it and bringing the vehicle to less than 8 M. P. H. But even with the no-free-wheeling setting there will still be engine clutch disengagement when the vehicle is moving between 1 and 8 M. P. H., if and only if, the accelerator is at that time released. It should also be noted that with this setting in use, movement of the brake pedal controlled valve plunger 151 has no effect in controlling engagement or disengagement of the engine clutch 44.

*Controlled-free-wheeling operation*

For the operator who prefers controlled freewheeling, the push button 222 is set to the half-out position. Figs. 10 to 14 show different combinations of plunger positions which may occur when driving with this setting. In this half-out position of the push button, the valve plunger 152 is so positioned that holes 252 and 253 of the plunger are in alignment with the holes 249 and 251 of the valve block 144.

A slight depression of the accelerator pedal raises the plunger 149 as in Fig. 10. This is sufficient to misalign the plunger hole 239 with the aligned holes 271 and 238 in the cover and block respectively. It also is sufficient to partly open the block hole 241 to the atmosphere through plunger slot 242. This position of plunger 149 shuts off the suction and connects the back end of the cylinder to the atmosphere through slot 242, hole 241, slot 268, gate 269, etc., whereby the engine clutch 44 is gently engaged.

Fig. 11 shows the position which plunger 149 takes when the accelerator pedal has been fully depressed. This change has not altered the status of clutch engagement, although the vehicle speed has of course been raised thereby, and the centrifugally controlled plunger 148 has been shifted downward until the plunger hole 236, which in Fig. 10 aligned with block hole 233, now is misaligned therewith, but the plunger hole 237, which in Fig. 10 was misaligned with block hole 234 and cover hole 272, now is aligned therewith.

Fig. 12 shows the position of plunger 149 when the accelerator pedal has been suddenly and completely released. The plunger hole 239 now aligns with the block hole 238 and cover hole 271, while the plunger slot 242 has moved back and closed the block hole 241. This instantly opens an air passage through cover hole 271 rearwardly through block hole 238 and plunger hole 239, through slot 264, forwardly through plunger hole 246 and block hole 243, through slot 261, rearwardly through plunger hole 252 and block hole 249, through slot 268, gate 269, passage 273 and hole 274 whereby clutch 44 is disengaged and freewheeling is in effect.

It will be noted that there is not now, as there is in Figs. 4, 5, 8, 10 and 14 any air passage through the slot 259 because the plungers 148 and 152 have this passage closed. It follows that, in Fig. 12, the only suction passage in effect is one that passes through the brake pedal controlled plunger 151.

If then, while free wheeling is thus in effect, the brake pedal is slightly depressed, the plunger 151 will be slightly raised as in Fig. 13, whereby the plunger hole 246 is misaligned with the block hole 243 and all suction passages will now be cut off and the engine clutch 44 will re-engage. How gently the clutch will re-engage and eliminate free-wheeling will depend on how slowly the brake pedal raises the plunger 151 to bring the plunger slot 247 over the block hole 244. When any part of the plunger slot 247 gets over the block hole 244 the rear end of the cylinder 138 is connected to the atmosphere by a passage extending in at cover hole 272, rearwardly through plunger hole 237, and block hole 234, through slot 266, forwardly through block hole 255, through slot 262, rearwardly through block hole 244 and plunger hole 247, through slot 267, forwardly through block hole 251 and plunger hole 253, through slot 263, rearwardly through block hole 256, through slot 268, gate 269, passage 273 and hole 274.

After the accelerator pedal has been thus released for free-wheeling and the brake then applied to eliminate free-wheeling as indicated by the plunger position in Fig. 13, the retarding influence of driving the engine by momentum, plus the retarding influence of braking, reduces the speed of the vehicle until 8 M. P. H., is reached. At this speed the plunger 148 will shift to the position shown in Fig. 14, and when it so shifts it misaligns the plunger hole 237 with the block and cover holes 234 and 272, and thereby closes the connection of the cylinder to the atmosphere which an instant before entered at 272. At the same time the plunger hole 236 is aligned with the block hole 233 whereupon another air passage is established with the cylinder 138 which extends from cover hole 271 rearwardly through block hole 238 and plunger hole 239, through slot 264, forwardly through block hole 254, through slot 259, rearwardly through block hole 233 and plunger hole 236, through slot 268, gate 269, passage 273 and hole 274. This latter passage may be established only by a concurrence of a released accelerator pedal and a drop in speed below 8 M. P. H., and it is effective to disengage the clutch 44 even though the clutch engaging influence of the brake pedal is still in effect.

From the foregoing description of the operation of the mechanism it will be seen that when the push button is in the extreme "in" position the engine clutch is disengaged whenever the accelerator pedal is released and engaged whenever the accelerator is depressed, regardless of what the speed may be at the moment, or how the brake pedal is operated, and, When the push button is in the extreme "out" position the engine clutch is engaged at all times except when there is a concurrence of a released accelerator pedal and a vehicle speed between zero to 8 M. P. H., and, When the push button is in the middle position there is clutch disengagement when the accelerator is released but clutch reengagement whenever the brakes are applied, except that when there is a concurrence of a release accelerator pedal, an applied brake, and a speed of less than 8 M. P. H., there will be engine clutch disengagement.

The ease with which a vehicle having the herein described mechanism may be driven is apparent. The operator need only depress the accelerator pedal to engage the engine clutch and start the vehicle. If the load is near zero, as on a slight down grade, the automatic clutch 75 will change from gear to direct drive at 8 M. P. H. If the load is maximum the same change will occur at about 30 M. P. H. He may voluntarily change at any time from automatic gear to automatic direct drive by releasing the accelerator pedal and creating zero load on the helical gearing. He may change from automatic direct drive to automatic gear drive by suddenly depressing the accelerator sharply and considerably so as to create load on the helical gears faster than it may be translated into speed to affect the centrifugal weights.

If he is not an experienced operator and does not know when he should employ gear drive and when he should employ direct drive the mechanism will shift from gear to direct whenever it can gain in speed under the then applied load, and conversely it will shift back to gear drive whenever it is losing speed under the then applied load. The experienced operator may change gear ratio at will except he may not remain in gear after a speed of about 30 M. P. H., is reached, nor remain in direct when less than a speed of 8 M. P. H., is in effect. It will be seen that not only is manual gear shifting unnecessary during driving, but that degree of automatic clutch operation or so called clutch free-wheeling which suits the operator's individual taste may be selected and employed.

While in the foregoing description I have indicated that the clutch operation mechanism is preferably operated by so called vacuum, taken from the intake manifold, it will be apparent that the same instrumentalities which are employed to apply vacuum, which is merely subatmospheric pressure, may be operated by pressure, that is by super atmosphere.

Having described an embodiment of the invention wherein the objects set forth are attained, I claim:

1. Automatic power transmission mechanism comprising, an engine, a transmission gear operable to different gear ratios, means for rotatably connecting the said engine to the said transmission gear, speed responsive means movable for changing the gear ratios of the said transmission gear, and means operable by the said movement of the said speed responsive means for controlling the said rotatable connecting means.

2. Automatic power transmission mechanism comprising, a transmission gear-set, an engine clutch engageable to connect the said engine to the said gear set, gearing in said gear set connectable to be revolved at different speeds, speed responsive means operative to connect said gear directly, and means operable by movement of said speed responsive means to control engagement of the said clutch.

3. Automatic power transmission mechanism comprising, an engine, a transmission gear-set, an engine clutch engageable to connect the said engine to the said gear-set, gearing in said gear-set revolvable at different speeds, means movable to connect said gearing to revolve in unison, a centrifugal device for moving said connecting means to connect said gearing, and means operable by the said movement of said connecting means to maintain engagement of said engine clutch.

4. Automatic power transmission mechanism comprising, an engine, a transmission gear-set, an engine clutch engageable to connect the said engine to the said gear-set, gearing in said gear-set revolvable at different speeds, means movable to connect said gearing to revolve in unison, centrifugal weights movable outwardly to move said connecting means, resilient means for moving said connecting means oppositely to disconnect said gearing, and means operable by said resilient means to disengage said engine clutch.

5. Automatic power transmission mechanism comprising, an engine, a transmission gear-set, an engine clutch engageable to connect said engine and gear-set, gearing in the said gear-set revolvable at different speeds, a transmission clutch for connecting said gearing to revolve at the same speed, and a speed responsive means for operating said transmission clutch and controlling the operation of said engine clutch.

6. Automatic power transmission mechanism comprising, an engine, a transmission gear-set, an engine clutch engageable to connect said engine to said gear-set, a driving and a driven member in said gear-set revolvable at different speeds, a transmission clutch engageable for connecting said members to revolve at the same speed, power means for operating said engine clutch, a speed responsive means for moving said transmission clutch into and out of engagement, and means operable by the said movement for controlling the said power means.

7. Automatic power transmission mechanism comprising, an engine, a transmission gear-set, an engine clutch engageable to connect said engine to said gear-set, a driving and a driven member in said gear-set revolvable at different speeds, a transmission clutch engageable for connecting said members to revolve at the same speed, fluid actuated means for operating said engine clutch, a speed responsive means for moving said transmission clutch into and out of engagement, and a valve operable by the said movement for controlling said fluid actuated means.

8. Automotive vehicle transmission mechanism comprising, an engine, a transmission gear-set comprising a gear drive and a direct drive, an engine clutch engageable for connecting said engine to said gear-set, means operable by reduction of the speed of said vehicle below a predetermined value for moving said gear set from direct to gear drive, an accelerator pedal releasable for reducing the vehicle speed, power means applicable for controlling said engine clutch, power applying means operative by release of said accelerator pedal, means restraining said power applying means and means operative by the said movement to gear drive for releasing the said restraining means.

9. Automotive vehicle transmission mechanism comprising, an engine, a transmission gear-set movable to provide gear drive or direct drive, an engine clutch engageable for connecting said engine to said gear-set, speed controlled means operable by reduction of the speed of said vehicle below a predetermined value for moving said gear-set to gear drive, an accelerator pedal releasable for reducing said vehicle speed, fluid actuated means for disengaging said engine clutch, a fluid valve operative by release of said accelerator pedal for providing a fluid passage for operating said fluid actuated means, and a second fluid valve operable by said speed controlled means for cutting off said passage until said movement into gear drive takes place.

10. Automotive vehicle transmission mechanism comprising, an engine, a transmission gear-set operable to provide different gear ratios, an engine clutch engageable for connecting said engine to said gear-set, power means for controlling said clutch, an accelerator pedal movable away from its low speed position to increase the vehicle speed, a power control means operable by said accelerator pedal movement, a centrifugal device operable away from its low speed position to change the said gear ratios, power control means operable by the said movement of the said centrifugal device, and means to render both control means ineffective to control said clutch operating power means except when both the accelerator pedal and the said centrifugal device are in the said low speed positions.

11. Automotive vehicle transmission mechanism comprising, an engine, a transmission gear-set operable to provide different gear ratios, an engine clutch engageable for connecting said engine to said gear-set, fluid actuated mechanism for controlling said clutch, an accelerator pedal movable away from its low speed position to increase the vehicle speed, a fluid valve operable by the said accelerator pedal movement, a centrifugal device operable away from its low speed position to change the said gear ratios, a second fluid valve operable by the said movement of the said centrifugal device, and means containing fluid passages to said fluid actuated mechanism for actuating said fluid actuated mechanism operative to be open only when both the said accelerator pedal and the said centrifugal device are in the said low speed positions.

12. Automotive vehicle transmission mechanism comprising, an engine, a transmission gear-set operable to provide a gear drive and a direct drive, an engine clutch engageable for connecting said engine to said gear-set, power operable means for controlling said engine clutch, a speed responsive transmission clutch movable into engagement for changing from gear drive to direct drive, a power control means operable by the said movement, an accelerator pedal movable for increasing the engine speed, a second power control means operable by said accelerator pedal, a brake pedal for applying vehicle brakes, a third power control means operable by said brake pedal, and power conveying means for applying the said power to the said power operable means to disengage said engine clutch, operative to be closed only by operation of the second control means, or by a concurrence in operation of the first and third control means.

13. Automotive vehicle transmission mechanism comprising, an engine, a transmission gear-set operable to provide a gear drive and a direct drive, an engine clutch engageable for connecting said engine to said gear-set, fluid operable means for controlling said engine clutch, a speed responsive transmission clutch movable into engagement for changing from gear drive to direct drive, a fluid valve operative to be closed by said movement, an accelerator pedal movable for increasing the engine speed, a second fluid valve operative to be closed by said accelerator pedal movement, a brake pedal movable for applying vehicle brakes, a third fluid valve operative to be closed by said brake pedal movement, and means comprising fluid passages connecting said fluid to said fluid operable means, said passages being interrupted only by closing the second valve or by a concurrence in the closing of the first and third valve.

14. Automotive vehicle transmission mechanism comprising, an engine, an engine clutch engageable to connect said engine to drive said vehicle, power means for operating said engine clutch, a power control means, a centrifugal means for operating said power control means, a second power control means, an accelerator pedal for operating said second power control means when increasing the engine speed, a third power control means, a brake pedal for applying said third power control means when applying vehicle brakes, a fourth power control means operable manually to three positions, power conveying means operable by the several said control means, the said conveying means being open when the fourth control means is in the first position and the second control means is unoperated, open when the fourth control means is in the third position and the second and first control means are both unoperated, and open when the fourth control means is in the second position and the second and third control means are both unoperated or when the first and second are both unoperated.

15. Automotive vehicle transmission mechanism comprising, an engine, an engine clutch engageable to connect said engine to drive said vehicle, fluid operable means for operating said clutch, a fluid valve, centrifugal means for operating said fluid valve, a second fluid valve, an accelerator pedal for operating said second fluid valve and for increasing the engine speed, a third fluid valve, a brake pedal for operating said third fluid valve and for applying vehicle brakes, a fourth fluid valve operable manually to three positions, means containing fluid passages operable by said fluid valves for connecting a fluid to said fluid operable means, the said fluid passages being open when the fourth fluid valve is in the first position and the second fluid valve is open, open when the fourth fluid valve is in the third position and the second and first are both open, open when the fourth fluid valve is in the second position and either the second and third valve are both open or the first and second valves are both open.

16. Automotive vehicle transmission mechanism comprising, an engine, an engine clutch enagageable to connect said engine to drive said vehicle, a transmission gear-set, a transmission housing a centrifugal device within said housing rotated by a member of said gear-set, a shaft rotatable by said device extending from the wall of said housing, an accelerator pedal and a brake pedal hinged to said housing, a fluid operated device secured to said housing, means connecting said fluid operated device to operate said clutch, a valve block on said fluid operated device, valves in said valve block and operating linkage connecting said accelerator pedal, said brake pedal and said shaft to said valves.

17. The combination, in power transmission and control mechanism, of an engine, a transmission gear set, an engine clutch for connecting said engine and gear set, a vacuum operated device for controlling said engine clutch, a centrifugally operated clutch for changing the gear ratios of the gear set, an accelerator pedal, a brake pedal, a manually operated control, a valve operated by movement of the centrifugally operated clutch, a valve operable by movement of the accelerator pedal, a valve operable by movement of the brake pedal, and a valve operable by the manually operated control, and means containing air conducting passages controlled by said valves operative in one position of the manually operated valve to connect the vacuum to disengage the engine clutch whenever the accelerator pedal is released, operative in a second position of the manually operated valve to connect the vacuum to disengage the engine clutch when the accelerator pedal is released and the centrifugally operated clutch disengages, and operative in an intermediate position of the manually operated valve to connect the vacuum to disengage the engine clutch when the accelerator pedal is released, the brake pedal is depressed and the centrifugally operated clutch disengages.

18. The combination, in power transmission and control mechanism, of an engine, a transmission gear set, an engine clutch for connecting the engine and gear set, a vacuum operated device for controlling said engine clutch, a centrifugally operated clutch for changing the gear ratios of the gear set, an accelerator pedal, a brake pedal, a manually operated control, a valve operable by movement of the centrifugally operated clutch, a valve operable by movement of the accelerator pedal, a valve operable by movement of the brake pedal, and a valve operable by the manually operated control, and means containing air conducting passages controlled by said valves operative in one position of the manually operated valve to cut off the vacuum to engage the engine clutch whenever the accelerator pedal is depressed, operative in a second position of the manually operated valve to cut off the vacuum to engage the engine clutch when the accelerator pedal is released and the centrifugally operated clutch engages, and operative in an intermediate position of the manually operated valve to cut off the vacuum to engage the engine clutch when the accelerator pedal is released the brake pedal is depressed and the centrifugally operated clutch engages.

19. The combination, in power transmission and control mechanism, of an engine, a transmission gear set, an engine clutch for connecting the engine and gear set, a fluid actuated device for controlling the engine clutch, a speed responsive clutch for changing the gear ratios of the gear set, an accelerator, a manual control, a valve operable by operation of the speed responsive clutch, a valve operable by operation of the accelerator, and a valve operable by the manual control, and means containing fluid passages controlled by said valves, operative in one position of the manually operated valve to permit the fluid to disengage the engine clutch whenever the accelerator is released, and operative in another position of the manually operable valve to permit the fluid to disengage the engine clutch when the accelerator pedal is released and the speed responsive clutch is disengaged at the same time.

20. The combination, in power transmission and control mechanism, of an engine, a transmission gear set, an engine clutch for connecting the engine and gear set, a fluid actuated device for controlling the engine clutch, a speed responsive clutch for changing the gear ratios of the gear set, an accelerator, a manual control, a valve operable by operation of the speed responsive clutch, a valve operable by operation of the accelerator, and a valve operable by the manual control, and means containing fluid passages controlled by said valves, operative in one position of the manually operated valve to cut off the fluid to permit engagement of the engine clutch whenever the engine is accelerated, and operative in the other position of the manually operated valve to cut off the fluid and permit engagement of the engine clutch when the engine is decelerated and the speed responsive clutch engages.

FREDERICK W. COTTERMAN.